United States Patent [19]

Kosters

[11] 4,412,567
[45] Nov. 1, 1983

[54] SILO BAG FILLING MACHINE

[75] Inventor: Larry J. Kosters, Sioux Center, Iowa

[73] Assignee: Roto Press Limited, Sioux Center, Iowa

[21] Appl. No.: 317,497

[22] Filed: Nov. 2, 1981

[51] Int. Cl.³ ............................................. B65B 3/08
[52] U.S. Cl. .................................. 141/114; 141/256; 141/231; 141/313; 198/558; 198/663; 414/526
[58] Field of Search ............... 414/326, 526; 198/558, 198/663; 100/112, 188, 189; 141/10, 12, 67–80, 141/100, 114, 256, 257, 311 R, 312, 313, 314, 141/315, 316, 317, 318, 377, 231–233, 391, 392; 56/344, 341

[56] References Cited

U.S. PATENT DOCUMENTS

| | | | |
|---|---|---|---|
| 993,294 | 5/1911 | Edison | 198/558 |
| 3,155,288 | 11/1964 | Landgraf | 198/558 |
| 3,158,375 | 11/1964 | Vig | 198/558 |
| 4,280,538 | 7/1981 | Hazelbaker | 141/256 |
| 4,308,901 | 1/1982 | Lee | 141/114 |

Primary Examiner—Houston S. Bell, Jr.
Attorney, Agent, or Firm—Merchant, Gould, Smith, Edell, Welter & Schmidt

[57] ABSTRACT

A device for filling a bag suitable for curing silage including a shroud ring adapted to hold a pleated bag, an auger device for forcing material from the hopper in which the auger lies into the bag. The entire device is mobile so that the bag can be placed on a surface and the auger, hopper and shroud ring assembly be moved away from the closed end of the bag as it is filled.

19 Claims, 5 Drawing Figures

SILO BAG FILLING MACHINE

BACKGROUND AND SUMMARY OF THE INVENTION

This invention pertains to devices for filling ensilage curing means and more particularly to a device adapted to fill an impervious bag with ensilage so that such a bag may be used as a silo for the storage of silage.

The use of vertical silos for the curing of ensilage and the storing of silage for livestock feed is well known. These silos have been built of wooden staves, concrete staves, tile, cement blocks and other material for a long period of time.

More modern silos now sometimes use vitreous linings in an upright silo. Other types of silage storing devices have also recently become more popularly used. Bunker silos, for example, include those formed with earthen or concrete walls bordering a broad trench. Thus, in effect, the upright silo is laid on its side. Because silage needs to cure essentially without being exposed to air, the key to the successful bunker silo is the use of an impervious plastic cover, which might also be used as a lining.

By my device, I provide for the use of a large bag formed of the same type of impervious material as the covers. This bag can best be used stretched out on the ground. Such bags are known in the art, (See U.S. Pat. No. 3,687,061 to Eggemulller et al) but I provide a relatively simple and effective device for forcing the ensilage into the bag and leaving the bag in place on the ground so that the bag does not have to be moved once it is filled. I do this by providing a moving filler means which may use a single auger as is illustrated in the following figures and described in the specification.

FIGURES

DESCRIPTION

Figure 1:
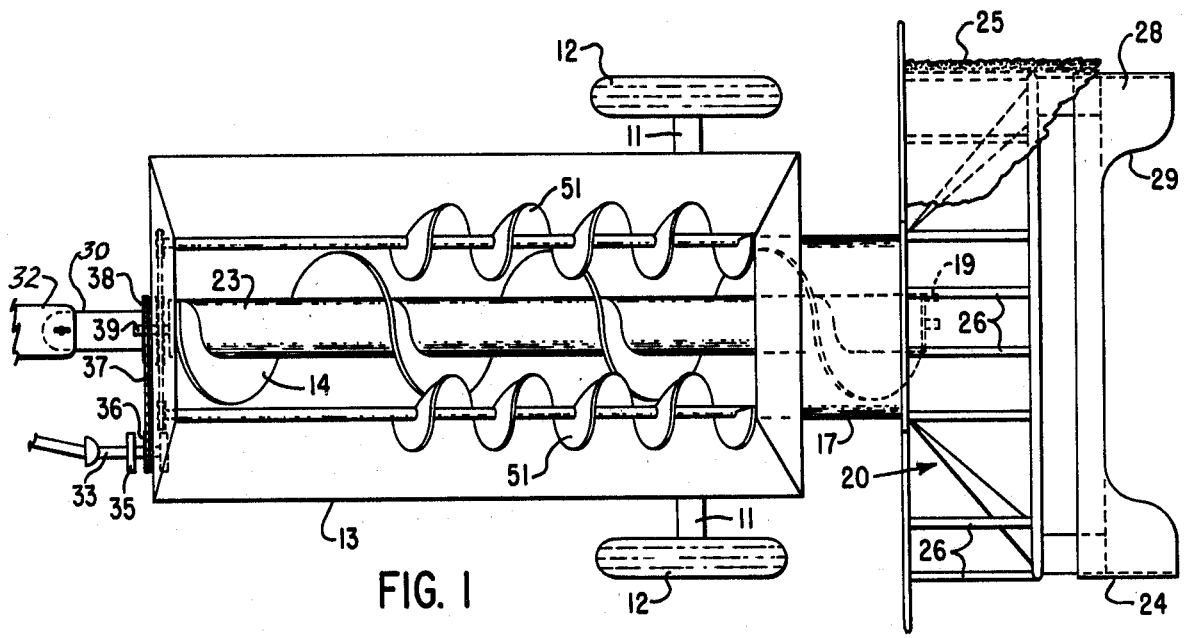
FIG. 1 is a top plan view of my device.
Figure 2:
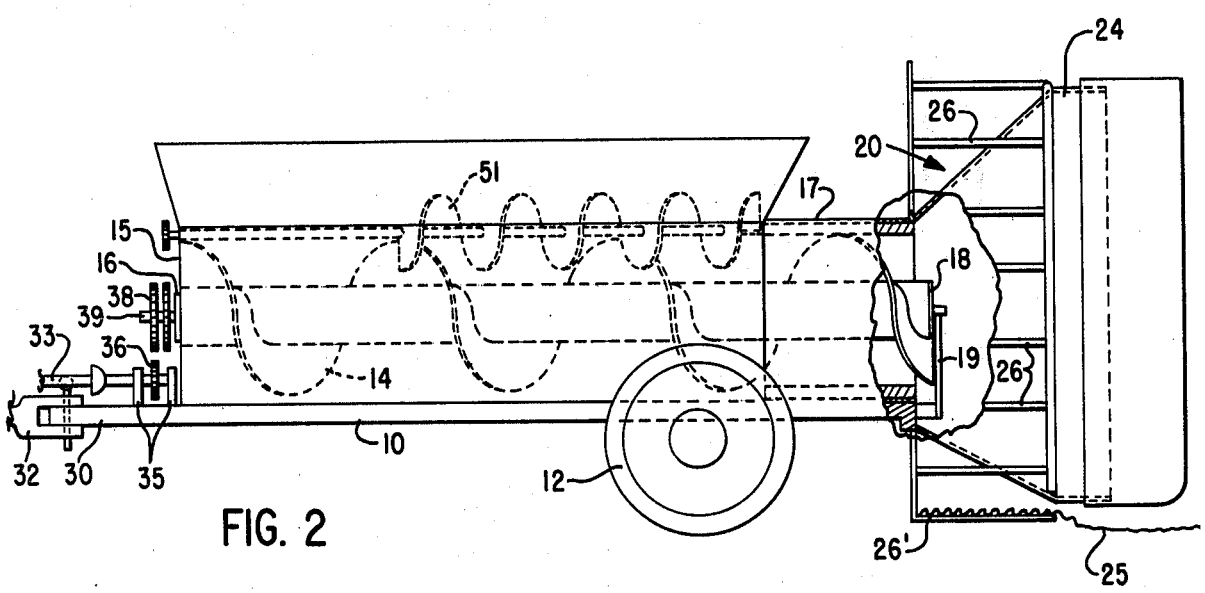
FIG. 2 is a side elevational view of my device with parts broken away to show underlying parts.
Figure 3:
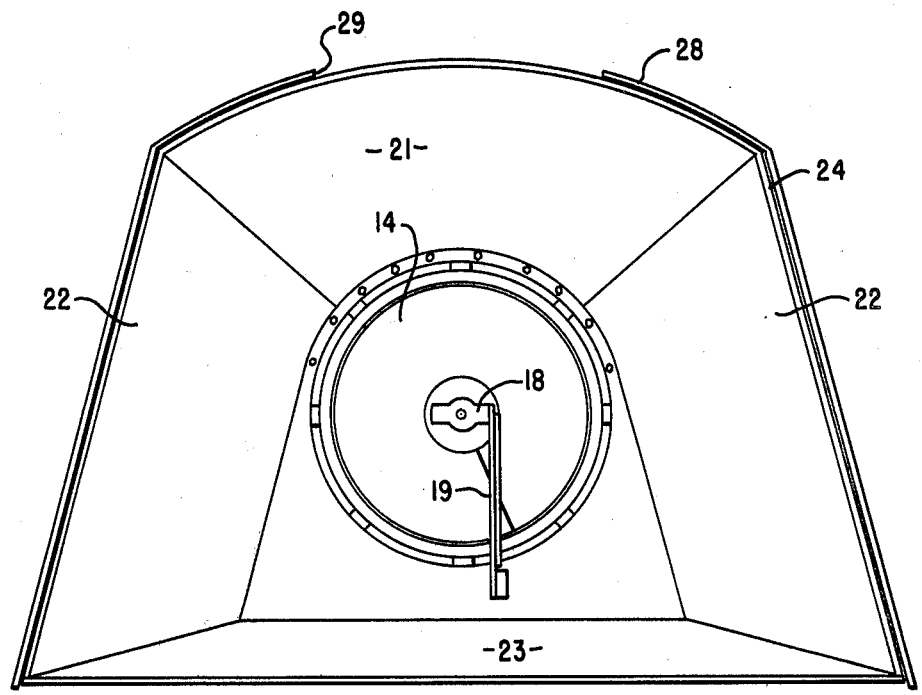
FIG. 3 is an end elevational view of the device with the bag removed.

Briefly my invention comprises a power driven device including an auger mechanism supported by bearings at two locations along the auger adapted to force ensilage into a large bag held on a shroud ring. As the bag is filled and lies on the surface, the filler moves, allowing the filled part of the bag to lie stationary on the ground.

More specifically and referring to the drawings, my device includes a frame 10 mounted on an axle 11. Wheels 12 are freely journalled on the axle 11 with no drive mechanism required, thus providing a traverse means. It is also envisioned that skids could be used to replace the wheels.

Figure 4:
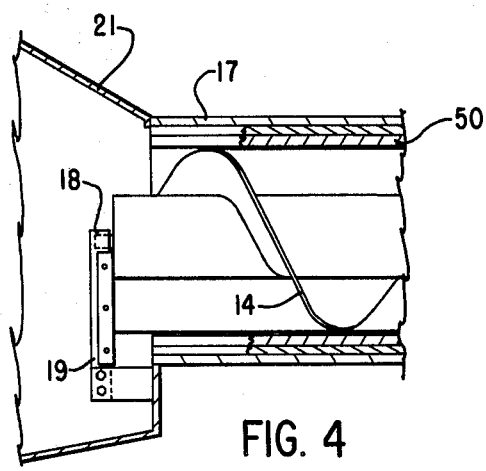
FIG. 4 is a detailed sectional view showing the end of the main auger.

A hopper 13 is mounted on the frame 10. This hopper includes a lower portion adapted to carry a principal auger mechanism 14. One end of the hopper 13 is closed by a wall 15 which carries a bearing 16 in which one end of the auger mechanism is journalled. At its other end, the hopper 13 empties into a tube 17. A bearing 18 at the outlet end of the tube is mounted on a bracket 19 on the frame 10. This bearing 18 supports the end of the auger mechanism through the outlet end of the hopper. The bracket 19 is preferably formed with a sharpened edge facing the auger 14 and close enough to the end of the auger so that there is a shearing action between the bracket 19 and the end of the auger (FIG. 4). It will be apparent that if desired, the auger could be supported in a bearing at the drive end and another bearing within the hopper located near the center of the auger, but the shearing action would not then be available.

The tube 17 extends a relatively short distance from the hopper 13 and empties into a funnel shaped housing 20 having a rounded top part 21 and outwardly sloping straight sides 22 and a slightly sloping bottom wall 23. A shroud ring 24 which is preferably not of circular shape, but rather takes the shape shown in the figures is carried by the housing 20, and preferably surrounds the top and the two sides. This ring 24 is adapted to receive and shape a plastic bag 25 whose sides are pleated and surround the ring. The innermost pleated layer may be held to the ring by clips (not shown) or the like if necessary, but in my experience such clips will not be necessary. However, a holding frame composed of fingers 26, again taking the form of the shroud ring 24 is desirable. The lowest fingers 26' may extend away from the ring 24 so as to carry the bag on the fingers just above the ground.

The ring 24 is formed with a curved upper edge 28 as best shown in FIG. 1. Although compaction of the ensilage is desired, an excess of compaction is not. Therefore, I provide an indented relief opening 29 by using the curved edge. Through the opening, any excess ensilage may be forced out thus relieving the pressure. It should be noted that my device will work without this feature, but I have found that the results are somewhat more satisfactory if the relief opening is provided.

Figure 5:
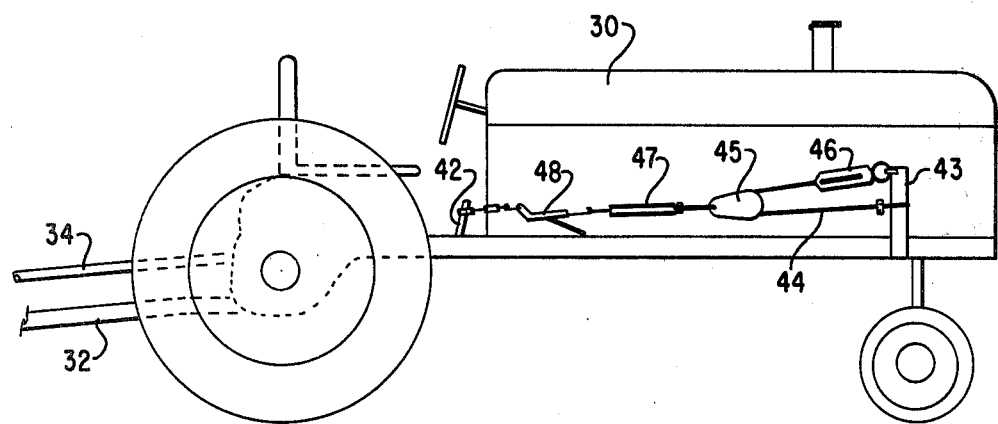
FIG. 5 is a view of the braking device as attached to a tractor.

The preferred method of operating my device requires the use of a farm tractor 30 (FIG. 5). A tongue 31 on the frame 10 is hitched to the tractor by the usual drawbar 32. A power shaft 33 is connected to the power take-off 34 of the tractor. This shaft 33 is journalled in a pair of bearings 35 mounted on the tongue and carries a drive sprocket 36. The drive sprocket 36 acting through a chain 37 drives a driven sprocket 38 mounted on the auger shaft 39. Thus the device can be both pulled and powered by the tractor.

In use, I prefer to place the machine initially with the bag carrying ring 24 near a wall of some type so that the bag as it fills will be backed up by a solid barrier. The tractor is started and ensilage is dumped into the hopper 13. The auger 14 picks up the material and forces it into the tube 17 and out through the housing 20 towards the end of the bag adjacent the ring 24.

As the material is forced into the bag, the pressure within the shroud ring 24 builds. This tends to force the entire tractor-filler combination away from the wall against which the bag is supported. Movement of the combination may be resisted by proper application of tractor brakes to achieve the compaction desired.

One mode of use of the tractor brakes is illustrated in FIG. 5. As shown in that figure, the tractor 20 is provided with a brake pedal 42. This pedal is arranged so that movement towards the front of the tractor imposes pressure on the tractor brakes. A bracket 43 is provided on the frame of the tractor between which and the brake pedal I provide for adjustable means by which to apply a measured amount of force to the pedal so that the proper resistance to motion can be used.

The means shown is the preferred means, but it will be apparent that a pushing device could be used or that parts of the illustrated device could be omitted or changed while remaining within the scope of the invention. As illustrated, however, the device consists of a cable 44 passing from the bracket 43 around a pulley 45 and then back to the bracket. A scale 46 may be inserted between the cable and the bracket so that tension can be measured in order to duplicate the amount of pressure on the brakes. A turnbuckle 47 and a stretching device 48 are also included in the connection. The turnbuckle 47 makes possible suitable adjustment so that pressure on the brake can be varied, and the stretcher 48 makes possible a quick and easy application and release of brake pressure.

Thus, as the bag 25 fills, pushing the device including the tractor away from the filling bag, the pleats of the bag become unfolded and gradually pay off of the fingers 26 providing added bag space to be filled. The whole process continues until the bag is completely filled and can be sealed off to provide the full horizontal silo.

During this process, the knife edge on the support 19 interacts with the end of the auger 14 to provide a shearing of the material and thus conserve the power necessary to push the material out of the auger 14 into the chute 17. This shearing action is also important in avoiding binding of the material between the flighting and the bearing support. Also, excess compaction can be relieved by the action of the relief opening 29 provided by the upper edge 28.

In order to be able to use a variety of types of ensilage to be stored in bags, an alternative may be necessary. This alternative requires only slight, but important, changes best shown in FIG. 4. Grain, or ensilage composed largely of grain requires that the auger 14 fit closely within the tube 17. On the other hand, I have discovered that ensilage composed largely of hay-like material will jam up such an auger. Therefore, I provide for a tube 17 having an inner diameter somewhat larger than the auger 14 to allow for considerable clearance between the auger and tube. This works well with haylage. In order to use the device with grain enriched ensilage I provide an insertable inner liner 50 with outer diameter for a fairly close fit inside the tube 17 and an inner diameter for relatively closer fit with the auger 14. If desired, multiple lining tubes 50 may be used to provide the necessary fits. Thus, I provide a device usable for various types of materials to be used to fill the bag.

I also provide means adapted to enhance movement of the material within the hopper 13. Some types of material tend to move toward the end of the hopper nearest the tube 17 and then either overflow that end, or bridge over. To avoid that situation, I provide auxiliary augers 51. These are driven from the sprocket 36 through a conventional chain drive. However, the flighting on the auger 51 should be of the opposite "hand", or should be driven to rotate in a direction opposite from that of the main auger 14. Thus, the material influenced by these augers 51 tends to move away from the tube 17.

I claim:

1. A device for filling material into a horizontal silo bag at its inlet, said device comprising:
a frame;
traverse means, mounted on said frame and engageable with the ground, for moving said frame relative to the ground;
means on said frame for receiving material, said material receiving means being formed to hold said silo bag, said material receiving means including a hopper, chute means for projecting the material into said bag, and means for delivering the material from said hopper to said chute means, said delivering means including an auger and an auger housing, said auger housing having a discharge end, said bag having an inlet end, said discharge end being substantially centered with respect to said inlet end, said chute means having walls inclining outwardly from said discharge end of said auger housing to said inlet end of said bag; and
means for driving said auger at one end of said auger.

2. The device of claim 1 in which said chute means terminates in a ring, said ring being formed to carry said bag.

3. The device of claim 2 in which fingers are mounted on said chute means to extend over said ring to carry said bag lying in pleats on said fingers whereby said pleats can be unfolded to extend said bag away from said ring.

4. The device of claim 1 in which said delivery means includes bearing means mounted on said frame at the driven end of said auger and at another point on said auger spaced a substantially axial distance from said driven end.

5. The device of claim 4 in which said other point is at the discharge end of said auger housing.

6. The device of claim 5 in which the bearing mount at the discharge end of said auger housing is formed with a knife edge adapted to cut material coming from said hopper, thus avoiding binding by the material between said auger and said bearing mount.

7. The device of claim 6 in which said auger has a discharge end and said knife edge is placed in close shearing relationship with the discharge end of said auger.

8. The device of claim 2 in which said ring is formed with an indented outer edge to provide always for some opening.

9. The device of claim 5 in which auxiliary auger means is provided in said hopper adjacent said first named driven auger and tending to move material in a direction opposite to said first named auger, said auxiliary auger means also being driven by said drive means.

10. The device of claim 5 in which said driven means includes a shaft means connectable to an outside power source, said outside power source being a tractor with brake means on said tractor adapted to resist movement of the said tractor and said frame as a unit, and means on said tractor adapted to apply said brake means.

11. The device of claim 10 in which said brake means includes adjustable means by which the amount of braking pressure can be adjusted.

12. The device of claim 11 in which said brake means includes release means by which said brake means can be quickly released and applied.

13. The device of claim 11 in which said brake means includes measuring means by which the amount of braking pressure can be duplicated by duplicating the reading on said measuring means.

14. The device of claim 1 in which said auger housing is a tube extending between said hopper and said chute means.

15. The device of claim 14 in which the inner diameter of said tube is enough larger than the outer diameter of said auger to provide a loose fit, said device including removable tube liners for placement between said auger and said tube.

16. A machine for loading material into an agricultural bag, said machine comprising:
a housing, including a hopper for holding said material, means for projecting said material into said bag, and means for connecting said hopper and said projecting means, said connecting means and said projecting means both having discharge ends, the discharge end of said connecting means being smaller than the discharge end of said projecting means;
means for forcing said material in said hopper through said connecting means to deposit said material substantially centrally in said projecting means;
means for driving said forcing means; and
traverse means for movably supporting said housing, whereby said machine moves with respect to said bag as said bag is filled with said material.

17. A machine for loading material into an inlet end of an agricultural bag, said machine comprising:
an auger;
means for supporting said auger, said supporting means including a tube for surrounding a portion of said auger, said supporting means including a first bearing and a first bearing mount attached to means for receiving material from a source, said supporting means including a second bearing and a second bearing mount attached to said tube near a discharge end of said tube, said second bearing mount cooperating with said auger to shear material passing therealong thereby preventing entanglement of said material, said auger moving said material from said receiving means through said tube to said bag;
means for holding said bag;
means for driving said auger; and
traverse means for allowing said auger and said supporting means to move with respect to said bag as said bag is filled with said material.

18. An agricultural bag filling machine comprising:
a hopper for receiving material from a source;
a funnel having a discharge end including means for supporting a portion of a bag;
a tube connecting said hopper and said funnel;
a horizontal auger for moving material from said hopper through said tube to a substantially central location on said funnel;
means for driving said auger; and
a wheeled frame for movably supporting said hopper, said tube and said funnel;
whereby material is moved from said hopper to said funnel to fill said bag, said wheeled frame moving away from said bag as material is compressed into said bag.

19. The machine in accordance with claim 17 wherein said auger has an axis and a flight extending outwardly therefrom, said second bearing having a side edge spaced from the auger axis; said second bearing mount being a sharpened bracket extending from the side edge of said second bearing to said tube, said sharpened bracket cooperating with said flight to provide a shearing function to prevent entanglement of said material.

* * * * *